US007770397B2

(12) United States Patent
Patel et al.

(10) Patent No.: US 7,770,397 B2
(45) Date of Patent: Aug. 10, 2010

(54) COMBUSTOR DOME PANEL HEAT SHIELD COOLING

(75) Inventors: Bhawan B. Patel, Mississauga (CA); Lorin Markarian, Etobicoke (CA); Kenneth Parkman, Georgetown (CA); Stephen Phillips, Etobicoke (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 935 days.

(21) Appl. No.: 11/592,174

(22) Filed: Nov. 3, 2006

(65) Prior Publication Data

US 2008/0104962 A1 May 8, 2008

(51) Int. Cl.
*F02C 1/00* (2006.01)
*F02G 3/00* (2006.01)

(52) U.S. Cl. ............................ 60/752; 60/756; 60/757; 60/758; 60/760

(58) Field of Classification Search .................. 60/752, 60/756, 757, 758
See application file for complete search history.

(56) References Cited

U.S. PATENT DOCUMENTS

| | | | | |
|---|---|---|---|---|
| 5,974,805 | A * | 11/1999 | Allen | 60/740 |
| 6,792,757 | B2 * | 9/2004 | Borns et al. | 60/772 |
| 7,509,813 | B2 * | 3/2009 | Stastny | 60/804 |
| 2008/0256955 | A1 * | 10/2008 | Parkman et al. | 60/752 |

* cited by examiner

*Primary Examiner*—Michael Cuff
*Assistant Examiner*—Craig Kim
(74) *Attorney, Agent, or Firm*—Ogilvy Renault LLP

(57) ABSTRACT

A gas turbine engine combustor having a dome heat shield includes a cooling scheme having a plurality of impingement cooling holes extending through the combustor and a plurality of adjacent ejector holes for directing cooling air past the heat shield lips of the dome heat shields. The impingement and ejector holes are preferably staggered to reduce interaction therebetween.

10 Claims, 4 Drawing Sheets

COMBUSTOR DOME PANEL HEAT SHIELD COOLING

TECHNICAL FIELD

The invention relates generally to gas turbine engine combustors and, more particularly, to combustor heat shield cooling.

BACKGROUND OF THE ART

Combustor heat shields provide protection to the dome portion of the combustor shell. The heat shields may be provided with radially inner and radially outer lips. These lips are exposed to high gas temperature relative to the remainder of an otherwise well-cooled heat shield, resulting in high thermal gradients. The thermal gradient inevitably results in cracks due to thermal mechanical fatigue. Cracking in the lips further deteriorates cooling effectiveness and results in additional damage due to high temperature oxidation.

Accordingly, there is a need for an improved cooling scheme while avoiding any detrimental effect on the rest of the heat shield surface cooling.

SUMMARY

It is therefore an object of this invention to provide an improved cooling technique.

In one aspect, provided is A combustor comprising an annular dome and inner and outer liners extending from said dome, said combustor having at least one circumferentially arranged row of impingement holes through the combustor and disposed to direct impingement cooling jets directly against a peripheral lip of a heat shield when the heat shield is mounted inside the combustor generally parallel to the dome, and said combustor having at least one circumferentially arranged row of ejecting holes defined through the combustor in a location relative to the heat shield when the heat shield is mounted inside combustor behind the heat shield relative to a general airflow direction within the combustor, the ejecting holes generally parallely aligned with a downstream wall of the combustor, wherein the impingement holes disposed adjacent the ejecting holes, and wherein the impingement holes and ejecting holes are circumferentially staggered relative to one another to thereby reduce interference of the respective flows through said impingement and ejecting holes.

In a second aspect, provided is a combustor dome cooling arrangement comprising: a combustor shell enclosing an annular combustion chamber and having an annular dome portion, at least one heat shield mounted to said dome portion inside the combustion chamber and having a back face axially spaced from the combustor shell to define a back cooling space between the shell and the heat shield, said heat shield having a radially inner lip and a radially outer lip respectively spaced from a radially inner wall and a radially outer wall of the combustor shell so as to define a radially inner gap and a radially outer gap, said back cooling space being in flow communication with both said radially inner gap and said radially outer gap, a set of back face cooling holes defined through the dome portion for directing cooling air into said back cooling space, radially inner and radially outer sets of lip impingement holes defined in the dome portion for respectively providing impingement cooling at the radially inner lip and at the radially outer lip of the heat shield, each of said impingement holes of said radially inner set having an angular impingement jet direction intersecting said radially inner lip, each of said impingement holes of said radially outer set having an impingement jet direction intersecting said radially outer lip, and radially inner and radially outer sets of ejection holes respectively generally axially aligned with said radially inner and radially outer gaps for pushing the cooling air coming from the back cooling space and the air impinging on the radially inner and outer lips out of the radially inner and radially outer gaps forwardly into the combustion chamber.

In a third aspect, provided is a method of cooling a gas turbine combustor heat shield: comprising directing a first jet of cooling air through a combustor wall and generally normally upon a surface of a peripheral lip of the heat shield, directing a second jet of cooling air through the combustor wall and generally paralelly past the surface of peripheral lip, and spatially staggering said first and second jets to minimize interference between them.

Further details of these and other aspects will be apparent from the detailed description and figures included below.

DESCRIPTION OF THE DRAWINGS

Reference is now made to the accompanying figure, in which.

DETAILED DESCRIPTION OF THE PREFERRED EMBODIMENTS

Figure 1:
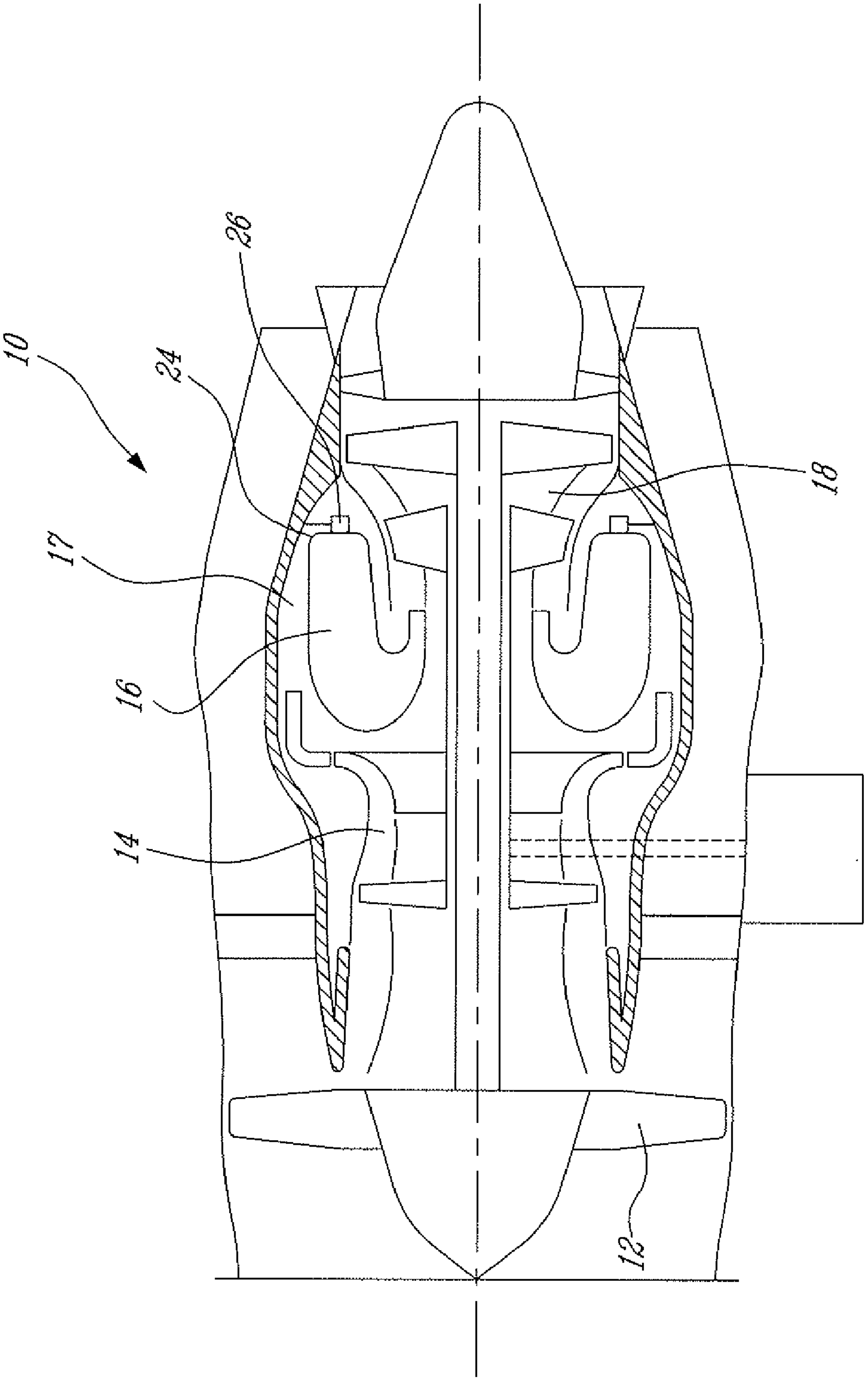
FIG. 1 is a schematic cross-sectional view of a turbofan engine having an annular combustor.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
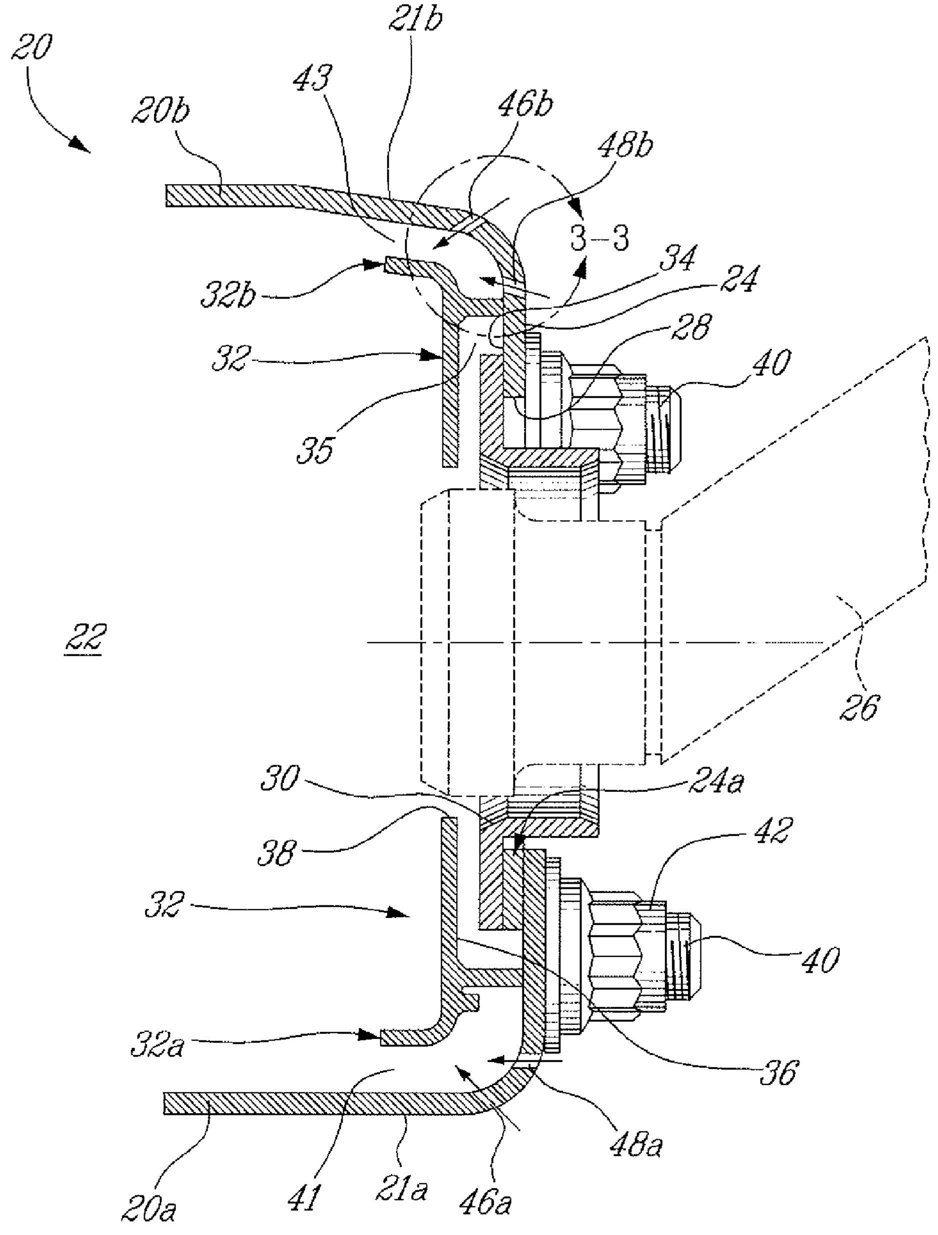
FIG. 2 is an enlarged schematic view of a dome portion of the combustor, illustrating one possible combustor dome heat shield lip cooling scheme.

The combustor 16 is housed in a plenum 17 supplied with compressed air from compressor 14. As shown in FIG. 2, the combustor 16 comprises an annular combustor shell 20, typically composed of a radially inner liner 20*a* and a radially outer liner 20*b*, each having a wall 21*a*, 21*b* respectively, defining a combustion chamber 22. The portion of the combustor illustrated in FIG. 2 is generally referred to as the dome 24 of the combustor 16. The dome 24 typically includes an annular dome panel 24*a* interposed between the inner and outer liners at the bulk end of the combustor 16. The term "dome panel" should however not be herein interpreted to strictly refer to a separate end panel between an inner liner and outer liner, but should rather be construed to refer to the end wall portion of the dome in general, irrespective of the detailed construction of the combustor shell.

Figure 5:
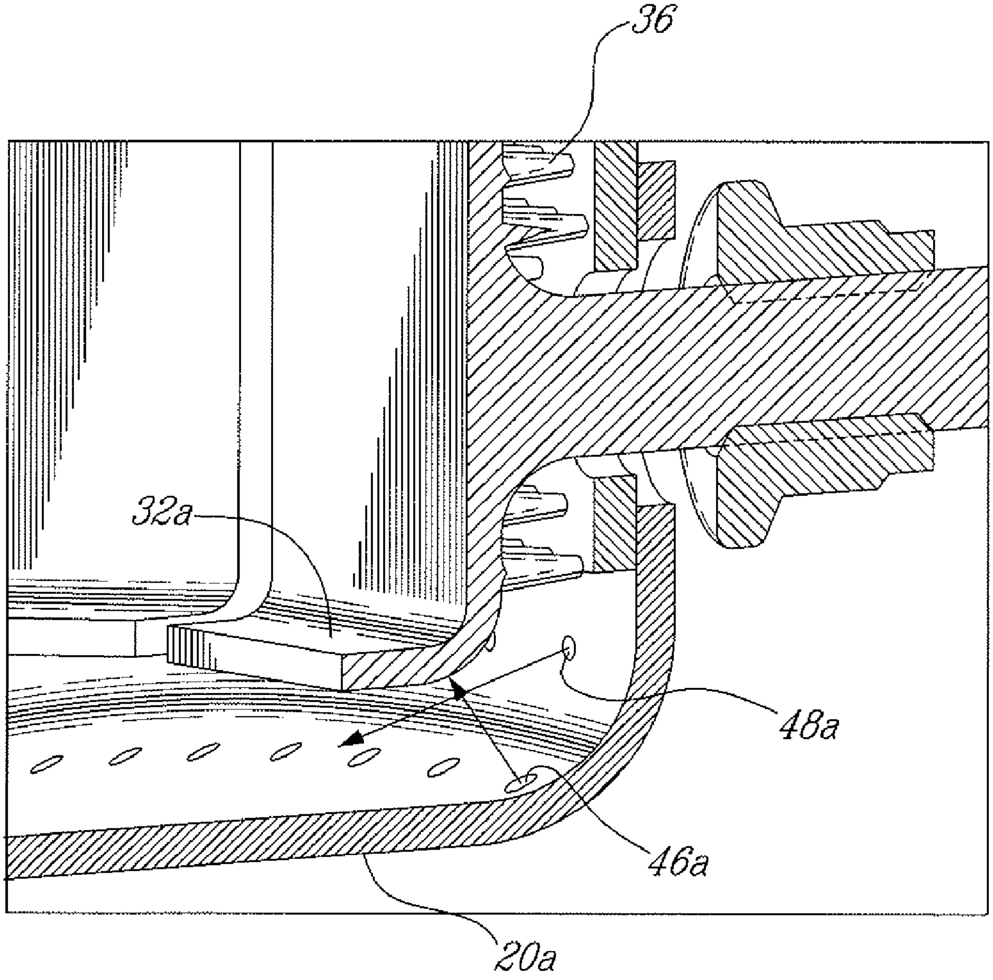
FIG. 5 is an isometric cutaway view of an inner side of the dome and liner.

A plurality of circumferentially spaced-apart fuel nozzles 26 are mounted in nozzle openings 28 defined in the dome panel 24*a* for delivering a fuel-air mixture into the combustion chamber 22. A floating collar 30 is mounted between the combustor shell 20 and each fuel nozzle 26 to provide a seal therebetween while allowing the nozzle 26 to move relative to combustor shell 20. A plurality of circumferentially segmented heat shields 32 is mounted to the dome 24 of the combustor shell 20 to substantially fully cover the annular inner surface 34. Each heat shield 32 is spaced from the inner surface 34 to define a back cooling space 35 such that cooling air may circulate therethrough to cool the heat shield 32. The heat shield 32 is provided on downstream or back surface thereof with a heat exchange promoting structure 36 (see FIG. 5) which may include ribs, pin fins, trip strips with divider walls, and/or a combination thereof. The heat promoting structure 36 increases the back surface area of the heat shield 32 and, thus, facilitate cooling thereof. Each heat shield 32 defines a central opening 38 for receiving one fuel nozzle 26. It is understood that each heat shield 32 could have more than one opening 38 for receiving more than one fuel nozzle. For instance, there could be one heat shield for each two circumferentially spaced-apart fuel nozzle. The heat shields 32 also have a plurality of threaded studs 40 for extending from the back thereof and through the dome panel 24*a* for attachment thereto by self-locking nuts 42.

The heat shield 32 has a radially inner lip 32*a* and a radially outer lip 32*b*. The lips form the radially inner and radially outer portion of the heat shield 34. In the illustrated embodiment, the inner and outer lips 32*a* and 32*b* project generally axially forwardly of the heat shield 32. The radially inner lip 32*a* is spaced from the inner liner 20*a* so as to define radially inner gap 41. Likewise, the radially outer lip 32*b* is spaced from the outer liner 20*b* so as to define a radially outer gap 43 therebetween. As will be seen hereinbelow, the cooling air in the back cooling space 35 and the cooling air used to cool down the lips 32*a* and 32*b* are discharged together into the combustion chamber 22 via the annular inner and outer gaps 41 and 43.

Impingement holes (not shown) are provided in the dome panel 24*a* for admitting cooling air from the plenum 17 into the back cooling space 35 for cooling the back surface area of the heat shields 32.

Figure 3:
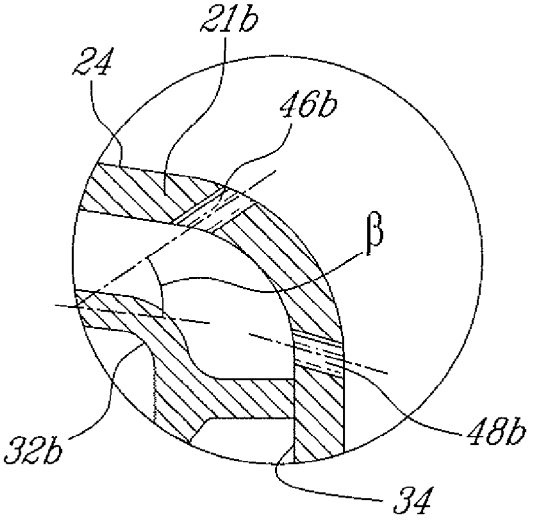
FIG. 3 is an enlarged view of detail 3 shown in FIG. 2.

As best shown in FIGS. 2 and 3, the inner and outer lips 32*a* and 32*b* of the heat shield 32 are cooled by impingement cooling jets. Impingement holes 46 are preferably located at an angle so that the impingement airflow does not obstruct the flow exiting from the back cooling space 35, and yet will provides impingement cooling on the lips 32*a* and 32*b*. The impingement holes 46 include at least one radially inner row of circumferentially distributed lip impingement holes 46*a* defined in the inner liner 20*a* for directing impingement jets directly onto the inner lip 32*a*. The impingement holes 46 also include at least one radially outer row of circumferentially distributed lip impingement holes 46*b* defined in the outer liner 20*b* for directing impingement jets directly onto the outer lip 32*b*. As depicted by the arrows in FIG. 2, each lip impingement hole 46 has an entry/exit axis or impingement jet direction pointing inwardly towards a central plane of the combustor dome and intersecting the corresponding lip 32*a,b* at angle β. Although impingement cooling is maximized when a cooling flow impinges the surface at right angles, such a flow in this case would tend to block flow attempting to exit the region behind the heat shield 32. Therefore, to improve the cross flow generally preferably a downstream angle of β of between 60 and 80 degrees, relative to the impingement target surface, is provided to maximize impingement effect and minimize blocking effect to the exit flow. In the illustrated embodiment, the inner and outer impingement holes 46*a* and 46*b* are defined in the transition area between the outer and inner liners and dome panel portions, although this may vary depending on combustor design.

Flow assisting or ejecting holes 48 are also defined through the dome 24, and more particularly preferably through the end wall of the dome 24, for moving cooling air out the inner and outer gaps 41 and 43 downstream of the heat shield 32 into the main combustion chamber 22. This provides for a continuous flow of fresh cooling air through the gaps 41 and 43, directed generally axially relative to the passage walls defining gasp 41 and 43. In the illustrated embodiment, a radially inner row of circumferentially distributed ejection holes 48*a* are defined in the dome end wall portion of the inner liner 20*a*. Likewise a radially outer row of circumferentially distributed ejection holes 48*b* are defined in the dome end wall portion of the outer liner 20*b*. The inner and outer ejection holes 48*a* and 48*b* are generally respectively aligned with inner and outer gaps 41 and 43 preferably such that the resultant jet exiting the holes 48*b* is parallel to the general direction of the respective inner and outer liner walls 21*a*, 21*b*, thereby maximizing the ejecting effect of the flows through holes 48. The jets admitted through these holes act as ejector jets for developing a low pressure to draw air out from the cavity behind heat shields.

Figure 4:
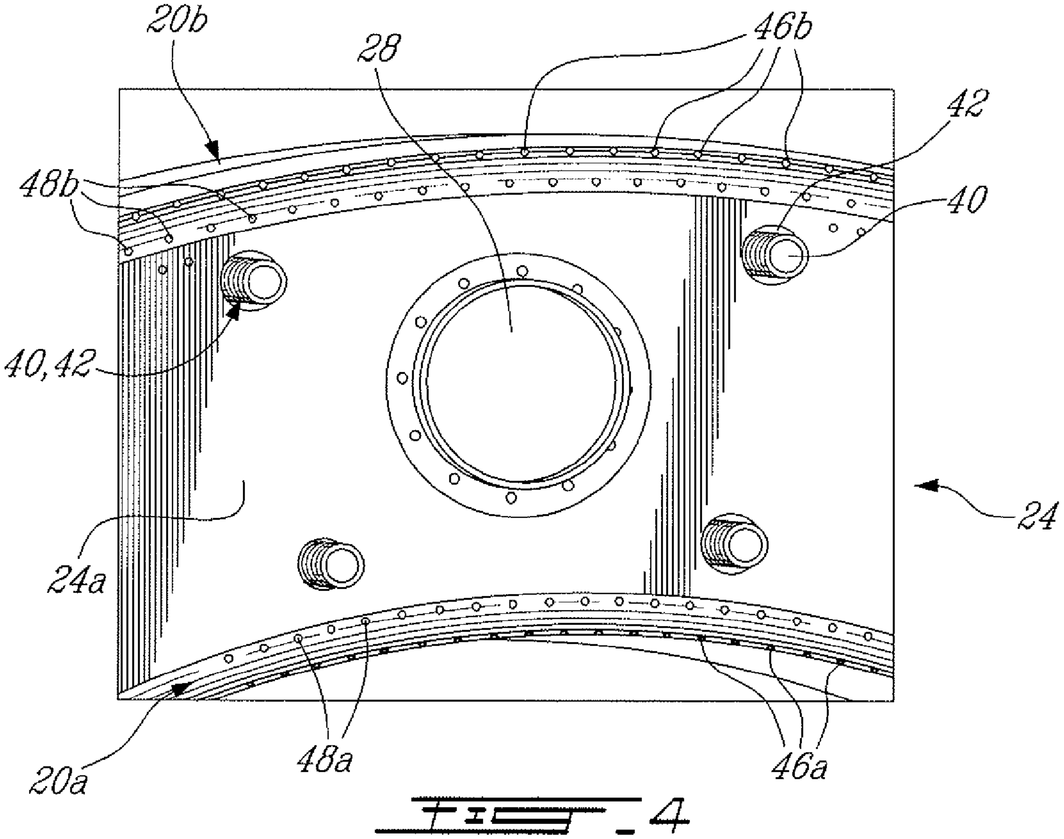
FIG. 4 is an outside end view of the dome of the combustor.

Preferably the ejector jet holes and the impingement jet holes are circumferentially offset relative to one another as shown in FIG. 4, so that the impingement holes and the ejection holes placement helps reduce interference that would, for example reduce the effectiveness of the impingement jets striking the lip surface, or reduce the effectiveness of the ejector flow. (The reader will appreciate that FIGS. 2 and 3 are schematic in the sense that the holes 46 and 48 on shown the same plane, when preferably they are not.) As can be appreciated from FIG. 4, the inner impingement holes 46*a* and the inner ejection holes 48*a* are circumferentially staggered so to that each ejection hole 48*a* falls between two adjacent impingement holes 46*a*, thereby reducing any impingement and ejection jet interferences.

In use, compressed air enters plenum 17. The air then enters holes 44*a* and 44*b* into the back cooling space 35 for impingement against the back face of the heat shield 32. The back face cooling air travels the heat exchange promoting structure 36, cooling them in the process. Part of the back cooling air will flow through effusion holes 50 defined through the heat shield 32 and along the front face thereof to provide front film cooling. The remaining part of the back cooling air will flow to the inner and outer gaps 41 and 43. In parallel, the inner and outer impingement holes 46*a* and 46 will direct impingement air jets respectively directly against the inner and outer heat shield lips 32*a* and 32*b*. The splashed lip impingement air after striking the heat shield lips 32*a* and 32*b* is pushed out of the inner and outer gaps 41 and 43 by the ejector air jets from ejector holes 48*a* and 48*b* together with the airflow coming from the back cooling space 35. The ejection air jets from ejection holes 48*a* and 48*b* help to push out the cooling air coming from the back face cooling space 35 by developing a low-pressure zone.

The above lip cooling scheme advantageously minimizes the thermal gradient while maintaining a smooth cooling airflow exiting from the heat exchange promoting structure 36 on the back face of the heat shield 32. The described lip cooling scheme provides improved cooling over the prior art with little or no added cost, weight or complexity The above description is meant to be exemplary only, and one skilled in the art will recognize that changes may be made to the embodiments described without departing from the scope of the invention disclosed. For example, the present approach can be used with any suitable heat shield configuration and in any suitable combustor configuration, and is not limited to application in turbofan engines. It will also be understood that the combustor shell construction could be different than the one described. For instance, the dome panel could be integrated to the inner or outer liners. The manner in which air space is maintained between the heat shield and the combustor shell need not be provided on the heat shield, but may also or alternatively provided on the liner and/or additional means provided either therebetween or elsewhere. Still other modifications which fall within the scope of the present invention will be apparent to those skilled in the art, in light of a review of this disclosure, and such modifications are intended to fall within the appended claims.

What is claimed is:

1. A combustor comprising an annular dome and inner and outer liners extending axially forwardly from said dome, said combustor having at least one circumferentially arranged row of impingement holes through the combustor and disposed to direct impingement cooling jets directly against a back surface of an axially forwardly extending peripheral lip of a heat shield when the heat shield is mounted inside the combustor generally parallel to the dome with said peripheral lip substantially parallel to the inner and outer liners, and said combustor having at least one circumferentially arranged row of ejecting holes defined through the combustor in a location relative to the heat shield when the heat shield is mounted inside combustor behind the heat shield relative to a general airflow direction within the combustor, the ejecting holes generally parallely aligned with the inner and outer liners of the combustor, wherein the impingement holes disposed adjacent the ejecting holes, and wherein the impingement holes and ejecting holes are circumferentially staggered relative to one another to thereby reduce interference of the respective flows through said impingement and ejecting holes; wherein the impingement holes are defined in a radiused corner between the dome and the adjacent liner, and wherein the electing holes are axially aligned with a radial gap defined between the peripheral lip and an adjacent one of said inner and outer liners.

2. The combustor dome cooling arrangement defined in claim 1, wherein each of said impingement holes has an angle of between 60 and 80 degrees relative to a target impingement surface of said peripheral lip.

3. The combustor dome cooling arrangement defined in claim 1, wherein the at least one row of impingement holes comprises two rows, one adjacent the outer liner and one adjacent the inner liner, and wherein the at least one row of ejecting holes comprises two rows, one adjacent the outer liner and one adjacent the inner liner.

4. A combustor assembly comprising: a combustor shell enclosing an annular combustion chamber and having an annular dome portion, at least one heat shield mounted to said dome portion inside the combustion chamber and having a back face axially spaced from the combustor shell to define a back cooling space between the shell and the heat shield, said heat shield having a radially inner lip and a radially outer lip both extending in an generally axially forward direction relative to said back face and said annular dome portion, said radially inner and outer lips being respectively spaced from an axially extending radially inner wall and an axially extending radially outer wall of the combustor shell so as to define an axially extending radially inner gap and an axially extending radially outer gap, said back cooling space being in flow communication with both said radially inner gap and said axially extending radially outer gap, a set of back face cooling holes defined through the dome portion for directing cooling air into said back cooling space, radially inner and radially outer sets of lip impingement holes defined in the dome portion for respectively providing impingement cooling at the axially extending radially inner lip and at the axially extending radially outer lip of the heat shield, each of said impingement holes of said radially inner set having an angular impingement jet direction intersecting said axially extending radially inner lip, each of said impingement holes of said radially outer set having an impingement jet direction intersecting said axially extending radially outer lip, and radially inner and radially outer sets of ejection holes respectively axially aligned with said axially extending radially inner and radially outer gaps for drawing the cooling air from the back cooling space and the air impinging on the axially extending radially inner and outer lips out of the axially extending radially inner and radially outer gaps forwardly into the combustion chamber.

5. The combustor assembly defined in claim 4, wherein each of said lip impingement holes has an impingement jet direction, the impingement jet direction pointing inwardly towards a central plane of the combustor dome.

6. The combustor assembly defined in claim 4, wherein the ejecting holes have an entry/exit axis substantially tangential to the corresponding axially extending radially inner and radially outer lips of the heat shield.

7. The combustor assembly defined in claim 4, wherein the radially inner rows of impingement holes and ejection holes have intersecting jet axes, and wherein the radially outer rows of impingement holes and ejection holes also have intersecting jet axes.

8. The combustor assembly defined in claim 4, wherein said radially inner impingement holes and said radially inner ejection holes define a first lip cooling scheme, said radially outer impingement holes and said radially outer ejection holes defining a second lip cooling scheme, and wherein the impingement holes and ejection holes of at least one of said first and second lip cooling schemes are angularly offset with respect to each other.

9. A method of cooling a gas turbine combustor heat shield: comprising directing a first jet of cooling air through a first set of holes in the dome combustor wall and generally normally upon a surface of a peripheral lip projecting axially forwardly from a front face of the heat shield generally in parallel with axially extending walls of the combustor, directing a second jet of cooling air through a second set of holes in the dome combustor wall and generally parallely past the surface of peripheral lip in an axially extending gap defined between the peripheral lip and an adjacent one of the axially extending walls of the combustor, and circumferentially staggering said first and second set of holes to minimize interference between them; wherein the first set of holes are defined in a radiused corner between the dome and the adjacent combustor wall, and wherein the second set of holes are axially aligned with a radial gap defined between the peripheral lip and adjacent one of the axially extending walls of the combustor.

10. The method as defined in claim 9, wherein the second jet of cooling air also acts as an ejector to draw air from a cavity defined between the heat shield and the dome combustor wall.

* * * * *

UNITED STATES PATENT AND TRADEMARK OFFICE

CERTIFICATE OF CORRECTION

PATENT NO. : 7,770,397 B2
APPLICATION NO. : 11/592174
DATED : August 10, 2010
INVENTOR(S) : Bhawan B. Patel et al.

It is certified that error appears in the above-identified patent and that said Letters Patent is hereby corrected as shown below:

Claim 1, column 5, line 33, delete "electing" insert --ejecting--

Signed and Sealed this

Fifth Day of October, 2010

David J. Kappos
*Director of the United States Patent and Trademark Office*